United States Patent [19]
Isella

[11] Patent Number: 5,275,264
[45] Date of Patent: Jan. 4, 1994

[54] SETTING SHOCK ABSORBER FOR CYCLES

[76] Inventor: Calzolari Isella, via Laura Bassi 23, Bologna, Italy

[21] Appl. No.: 951,574

[22] Filed: Sep. 25, 1992

[51] Int. Cl.⁵ ............................................. F16F 9/46
[52] U.S. Cl. ................................ 188/299; 188/319; 188/322.15; 267/64.15; 280/276
[58] Field of Search .............. 280/276, 272, 275, 277; 188/299, 319, 269, 298, 282, 281, 322.22, 322.15, 317, 316; 267/64.15

[56] References Cited

U.S. PATENT DOCUMENTS

| | | | |
|---|---|---|---|
| 4,295,658 | 10/1981 | Kashima | 188/272 X |
| 4,367,882 | 1/1983 | Alexander et al. | 188/272 X |
| 4,766,982 | 8/1988 | Hayashi et al. | 188/272 X |
| 4,815,763 | 3/1989 | Hartmann | 280/276 |
| 5,014,966 | 5/1991 | Wang | 188/319 X |
| 5,186,481 | 2/1993 | Turner | 280/276 |
| 5,195,766 | 3/1993 | Dohrmann et al. | 280/276 |

*Primary Examiner*—Douglas C. Butler
*Attorney, Agent, or Firm*—McAulay Fisher Nissen Goldberg & Kiel

[57] ABSTRACT

A shock absorber for cycles which is adapted to be coupled to the fork of a cycle frame and is provided with an oil circulation system which is controlled by the driver through a lever which controls a stabilizing spring controlling the oil flow from one cylinder to another cylinder of a shock absorber. The invention includes a pair of telescoping cylinders with oil flow from one chamber into the other being controlled to effect delay in the movement to absorb road shocks due to a change in the road.

19 Claims, 1 Drawing Sheet

SETTING SHOCK ABSORBER FOR CYCLES

BACKGROUND OF THE INVENTION

1. Field of the Invention

This invention relates to shock absorbers for cycles. More particularly, the invention is concerned with shock absorbers for bicycles and motor-cycles for use on rough and uneven roads.

2. Description of the Prior Art

In their normal use, two-wheeled vehicles of the cycle type are conventionally made with rigid forks because usually they are not able to deaden stress forces imparted to the frame, due to road-bed unevenness, and therefore, rigid forks are used only on level and substantially even roads.

There has now arisen on the market a new type of bicycle and motor-cycle which are primarily used in a sales directed to the realization of bicycles and motor-bicycles for sport activity and are usable on mixed roads, such as an uneven hilly ground. These types of bicycles and motor-bicycles have brought into use devices known as telescopic re-entry front forks which are equipped with shock absorbers for impact stress absorption. One form of prior art, which uses spring mechanical members to obviate a kick back effect that such springs cause on the frame, is the use of hydraulic shock absorbers which provide for a soft damping. These type of shock absorbers provide for a non-variable damping effect, are adjustable from the ground by setting of a throttle valve. Consequently, with these types of shock absorbers, it is not possible to adjust the damping effect as occasion may require. Furthermore, these shock absorbers which use an oil circulation system with a sole pipe and which act with different types of valves are subject to a quick deterioration because a jamming action may arise which is caused by flow residues, or a possible shortcoming between the different parts and, therefore, they are hindered in their operation.

SUMMARY OF THE INVENTION

An object of the present invention is to provide for a setting shock absorber with a manual drive suitable for use with the front fork of bicycles and motor-bicycles.

Another object of the invention is to provide for a shock absorber which avoids jamming.

The present apparatus provides for a solution to both of these problems, of jamming due to flow residues or a shortcoming due to the different parts, by means of a new type of telescopic hydraulic shock absorber in which the setting to effect the action by the shock absorber is constantly controlled during travel of the cycle by the driver. Moreover, the shock absorber is made up with an oil circulation system with additional crossing holes on the basis of a new system which raises the apparatus in correspondence with the road and assures its operation in a timely fashion.

Principally, the principle of operation of the setting device according to the teachings of the invention is based on a spring loading, which raises up and seats, and is accomplished by means of a variator device. The variator device is activated by a lever which places into action a loading spring by fit return and on the basis of pre-arranged displacements which are visualized by a variably positioned index.

DESCRIPTION OF THE PREFERRED EMBODIMENT

Figure 1:
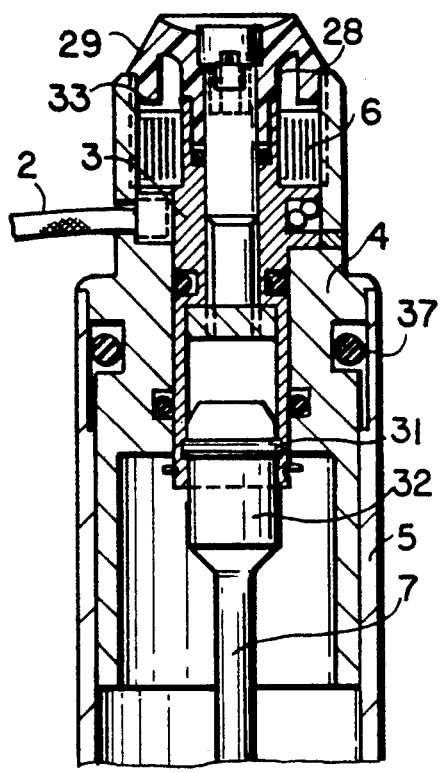
FIG. 1 is a longitudinal sectional view of part of the shock absorber to point out the variation in the oil pressure.
Figure 3:
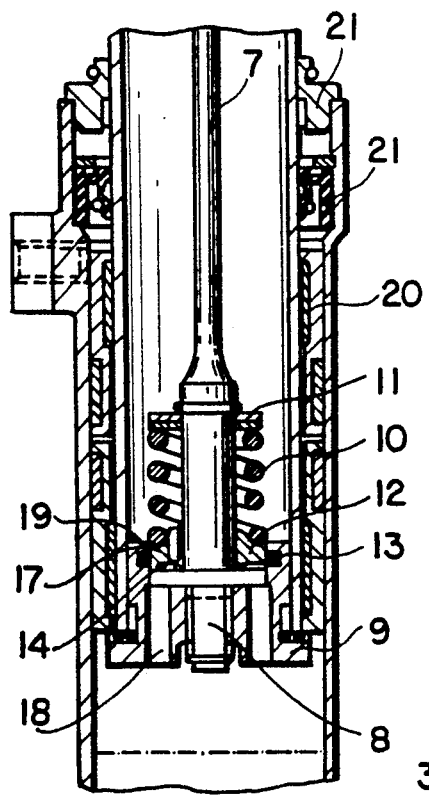
FIG. 3 is a longitudinally sectional view of a part of the shock absorber showing in detail the damping block.
Figure 4:
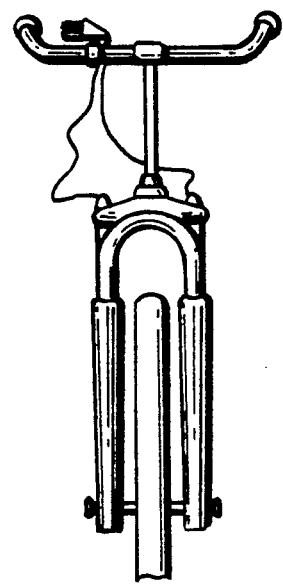
FIG. 4 is a front schematic view of a cycle showing the front fork equipped with a pair of shock absorbers in accordance with the invention.

Referring now more particularly to the drawings which show the best mode presently contemplated by me for carrying out the invention, the setting device according to the invention includes a toothed lever 1 which is stirruped to a frame of the cycle for use by a cycle driver, and it is connected to a steel cable 2 for rotating a rotatable bush 3 (FIG. 1) in a stationary bush 4 of a tubular arm 5. Bush 3 is tied to or coupled with a first end of a band spring 6 and the other end of the band spring is tied to or coupled with the rigid bush 4. Rod 7 is associated with bush 4 and is controlled by band spring 6, and movement of rod 7 takes place in either a screwing or an unscrewing direction so that a threaded end 8 (see FIG. 3) of rod 7 is moved into a volute threaded bush 9 (FIG. 3) in chamber 15 which accomplishes a loading and a releasing of spring 10 which is stabilized between a bearing point 11 and a holed piston 12, and at the piston end 13, there is interposed a plastic ring 14 between the holed piston 12 and the spring 10 to provide for or make an adjustable shutter.

Figure 2:
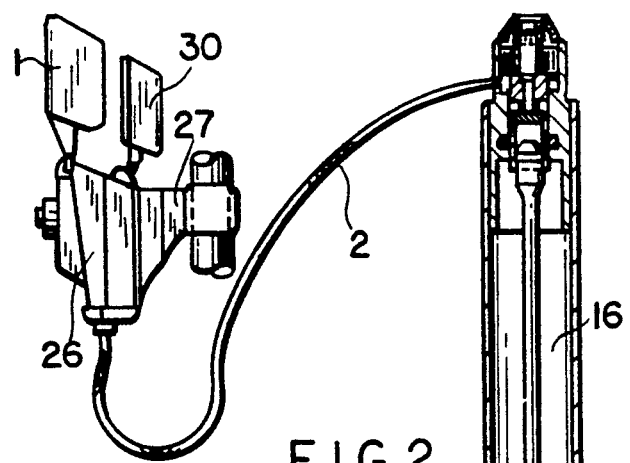
FIG. 2 is a longitudinal sectional view of the shock absorber and laterally connected with a variation device.

The spring loading and releasing is simplified and made easy by contrast with the piston 12 for a tight oil crossing or oil flow or for a complete stopping of the oil crossing or oil flow of the oil from the lower chamber 15 to the upper chamber 16 (FIG. 2). The plastic ring is facilitated to open the hole 17 of the holed piston 12 to enable the oil to flow through the holes from the first chamber 15 to the second chamber 16 and then in a reverse direction into the first chamber 15. Chambers 15 and 16 are formed from a pair of telescopic bodies with the body enclosing chamber 16 telescoping into the body of chamber 15 which forms the outer body. From the upper chamber 16 to the lower chamber 15, the air is expanded and expansion of the air then compresses the air in the chamber 16 by the oil flow which then again flows into the chamber 15 passing through a system of five holes 17 in the piston 12 when the piston 12 is moved away from and is freed from the plastic ring 14 to open holes 17 to permit the oil flow therethrough. The oil flows from the lower chamber 15 into the upper chamber 16 and passes through two holes 18 (FIG. 3) which are provided in or fixed in the bush 9. The oil flow from lower chamber 15 to upper chamber 16 is adjustable by means of a couple or pair of holes 18, and the adjustable oil flow pushes the piston 12 whose holes 17 are then occluded by the plastic ring 14. The piston 12, under control of the spring 10 beats onto the beating point 11 and compresses spring 10, and piston 12 is pushed beyond the end 19 of the bush 9.

In particular, the outer cylindrical portion of the conical body of chamber 16 slips into or moves into an outer cylindrical portion of the outer conical body of the chamber 15 and is guided by means of two ferrules 20 fixed to the outer portion of the conical body of the chamber 15. Furthermore, the conical body of chamber 15 is provided with seals 21 to avoid any exiting of the oil onto the outside of chamber 16 and to permit the cleaning of the chamber 16 cylinder. A separator 22 (see FIG. 2) is inserted into the conical body of chamber 15 together with a seal 23 which acts as a bottom and determines the oil quantity. At the lower end of the conical body of chamber 15, there is provided a hub connection 24 having a bore 25 for air drainage during a fitting up of the separator 22 with seal 23.

A holder 27 supports a setting block 26 on the cycle frame, and the holder 27 also supports toothed lever 1 on the frame of the cycle.

A valve 28 for controlling the air input is provided with a pre-arranged register value scale, and is actuated by the damping effect setting by means of the bush 3 through the valve 28 for the control of the air input acting on the oil compression.

Figure 5:
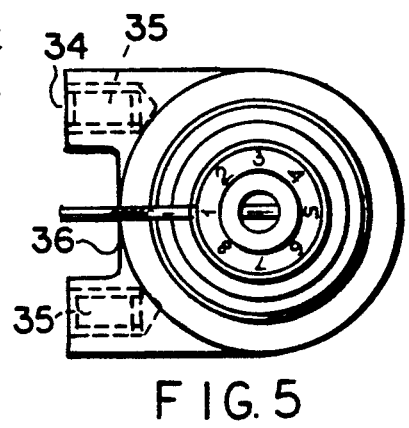
FIG. 5 is a top view of the shock absorber as shown in FIG. 4 with the handle bar parts removed.

Connected with the bush 3 is a cap 29 which provides a protective cover as protection for the spring 6 and that, being centrally bored, permits the introduction of a loading means for the air valve 28. The cap 29 also acts as graduation index on which comes to lie the toothed lever 1. To partially or completely eliminate the loading effected by lever i, block 26 is also acted on by lever 30 which is an element of the block 26. In particular, bush 3 drives its motion through pin 31 (FIG. 1) to the rod 7 which has a grooved end 32. The bush 3 is blocked by means of a plastic ring 33 fixed to bush 4 integral with the cylinder defining chamber 16. The protection cap 29 is fitted by a joint to the bush 3. Externally, the conical body of chamber 15 is provided with two lug bolts 34 (FIG. 5) each provided with threaded bores 35 for anchorage into slits 36 of a cycle fork which joins in an integral way with the pair of shock absorbers. Seals 37 are provided in the bush 4 between bush 4 and tubular arm 5.

While there has been shown and described what is considered to be the preferred embodiment of the invention, various changes and modifications may be made therein without departing from the scope of the invention.

I claim:

1. A setting shock absorber with a manual drive for bicycles and motor-bicycles, having a cycle frame, comprising:
    a setting device stirruped to the frame including a toothed lever (1) and a steel cable (2) driven thereby;
    a rotatable bush (3) and a rigid bush (4), said rotatable bush being rotatable in said rigid bush (4), and said steel cable (2) being coupled to said rotatable bush (3);
    a band spring (6), one end of said band spring 6) being connected to said rotatable bush (3) and the other end of said band spring (6) being connected to said rigid bush (4);
    said lever (1) through said steel cable (2) rotating said rotatable bush (3) in said rigid bush (4) for rotating a rod (7), and movement of said rotatable bush (3) actuating a screwing or an unscrewing action of said rod (7);
    said rod having a threaded end (8) which is received into a volute threaded bush (9) for loading or releasing of a spring (10) stabilized between a bearing point (11) and a holed piston (12) having holes (17);
    at an end (13) of said piston (12), there is interposed a plastic ring (14) between said holed piston (12) and said spring (10) forming an adjustable shutter for said holes (17);
    the loading or releasing of said spring (10) to facilitate said plastic ring (14) opening the holes (17) of said holed piston (12) permits oil flow through the holes (17) of said piston (12) for oil crossing flow from a first chamber (15) to a second chamber (16) and from the second chamber (16) to the first chamber (15) and is acted on by air expansion and compression into the second chamber (16) by the oil flow which then flows again into the first chamber (15) passing through said holes (17) of the piston (12) freed by said plastic ring (14) forming said adjustable shutter;
    said oil flowing from said first chamber (15) to said second chamber (16) passing through two holes (18) fixed in said threaded bush (9), and the oil flows to an adjustable flow through said two holes (18) under the control thereof and pushes said holed piston (12) and said holes (17) being occluded by said plastic ring (14);
    said piston (12) being under control of said spring (10) in bearing onto said bearing point (11), and being pushed beyond an end (19) of said threaded bush (9);
    said toothed lever (1) being connected with a setting block (26) provided with a holder (27) for supporting said lever to said cycle frame; and
    an air input control valve (28) provided with a pre-arranged register value scale and responsive to said bush (3), said valve (28) being actuated by a damping effect setting for control of air input acting on the oil compression.

2. The shock absorber according to claim 1, including ferrules (20) fixed to the conical body of said first chamber (15) to enable the conical body of said second chamber (16) to telescopically move into and out of said second chamber (15).

3. The shock absorber according to claim 1, wherein said first and second chambers (15) and (16) each have a conical body and includes seals (21) to avoid exiting of the oil and to permit cleaning of said second chamber (16) and said two conical bodies are telescopically related to each other.

4. The shock absorber according to claim 1, including, in said first chamber, a separator (22) having a seal (23) acting as a bottom for said first chamber for determining oil quantity.

5. The shock absorber according to claim 1, including at a lower end of said first chamber (15), a hub (24) having a bore (25), for air drainage.

6. The shock absorber according to claim 1, including a spring (3) and a cap (29) connected with said rotatable bush (3) for protection of said band spring (6) and loading means for an air valve (28) insertable into a central bore of said rotatable bush (3).

7. The shock absorber according to claim 6, wherein said setting block (26) includes a lever (30), and said cap (29) acting as a graduation index on which said toothed lever (1) lies to produce a zero loading effect by said toothed lever (1) when acting on said lever (30) of said block (26).

8. The shock absorber according to claim 7, including a pin (31) and said rod (7) having a grooved end (32), said pin (31) connecting said rotatable bush (3) with said grooved end (32) for driving said rod (7) with said grooved end (32) through said pin (31).

9. The shock absorber according to claim 1, including a second plastic ring (33) for blocking said rotatable bush (3), said second plastic ring (33) being fixed to said rigid bush (4) and being integral with said second chamber (16).

10. The shock absorber according to claim 6, including a protection cap (29) connected to said rotatable bush (3).

11. The shock absorber according to claim 1, including two lug bolts (34) each having threaded bores (35), said lug bolts (34) being external of said first chamber (15) for anchorage into slits (36) of a fork of said cycle frame for integrally coupling thereto said setting device.

12. The shock absorber according to claim 1, including seals (37) set into said block (26).

13. The shock absorber according to claim 1, including a cap connected with said rotatable bush, said setting block (26) including a lever (30), and said cap (29) acting as a graduation index and said toothed lever lies on said cap (29) to produce a zero loading effect by said lever (1) acting on said lever (30) of said setting block (26).

14. The shock absorber according to claim 1, including a pin (31), said rod (7) having a grooved end (32), said rotatable bush (3) driving said rod (7) through said pin (31).

15. The shock absorber according to claim 1, including a protection cap (29) coupled to said rotatable bush (3).

16. The shock absorber according to claim 2, including a plastic ring (33) for blocking said rotatable bush (3), said ring (33) being fixed to said rigid bush (4) and being integral with said conical body of said second chamber (16).

17. The shock absorber according to claim 16, including two lug bolts (34) each having threaded bores (35), said lug bolts (34) being external of said first chamber (15) for anchorage into slits (36) of a fork of said frame for coupling thereto said setting device.

18. The shock absorber according to claim 2, including at a lower end of said first chamber, a hub (24) having a bore (25), and said separator (22) with said seal (23) acting as a bottom for determining oil quantity and air drainage.

19. The shock absorber according to claim 18, including a spring (3) and a cap (29) connected with said rotatable bush (3) for protection of said band spring (6) and loading means for an air valve (28) insertable into a central bore of said rotatable bush (3).

* * * * *